United States Patent [19]

Tabaczynski

[11] 3,930,469
[45] Jan. 6, 1976

[54] CARBURETED PRECHAMBER ROTARY COMBUSTION ENGINE

[75] Inventor: Rodney J. Tabaczynski, Birmingham, Mich.

[73] Assignee: General Motors Corporation, Detroit, Mich.

[22] Filed: June 19, 1974

[21] Appl. No.: 480,624

[52] U.S. Cl. ............................ 123/8.13; 123/8.07
[51] Int. Cl.² ................................. F02B 53/04
[58] Field of Search ..................... 123/8.13, 8.07

[56] References Cited
UNITED STATES PATENTS
3,785,352 1/1974 Date et al. .................... 123/8.13

Primary Examiner—Carlton R. Croyle
Assistant Examiner—Michael Koczo, Jr.
Attorney, Agent, or Firm—Ronald L. Phillips

[57] ABSTRACT

A rotary combustion engine arrangement having a prechamber rotary engine section in which a rich air-fuel mixture is spark ignited with the hot combustion gases thereof directed into a lean air-fuel mixture for ignition thereof in a main chamber rotary engine section.

3 Claims, 6 Drawing Figures

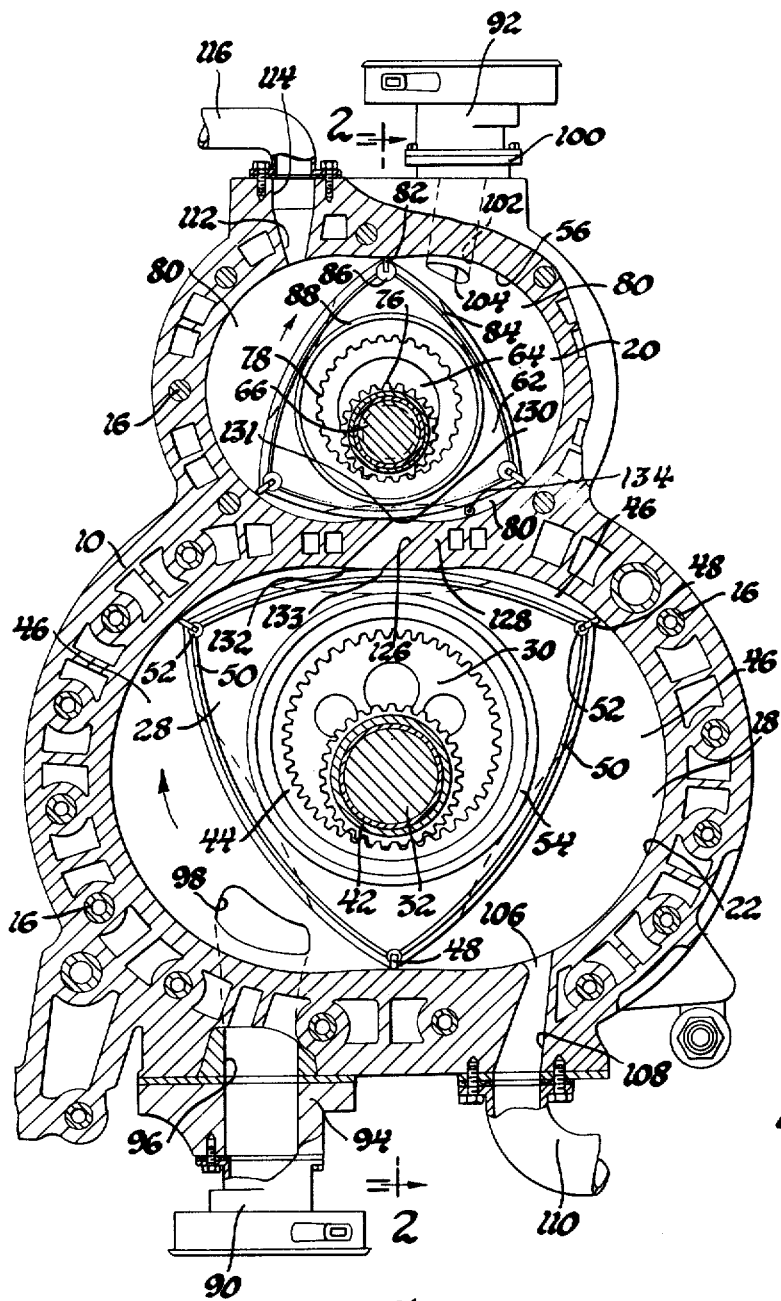
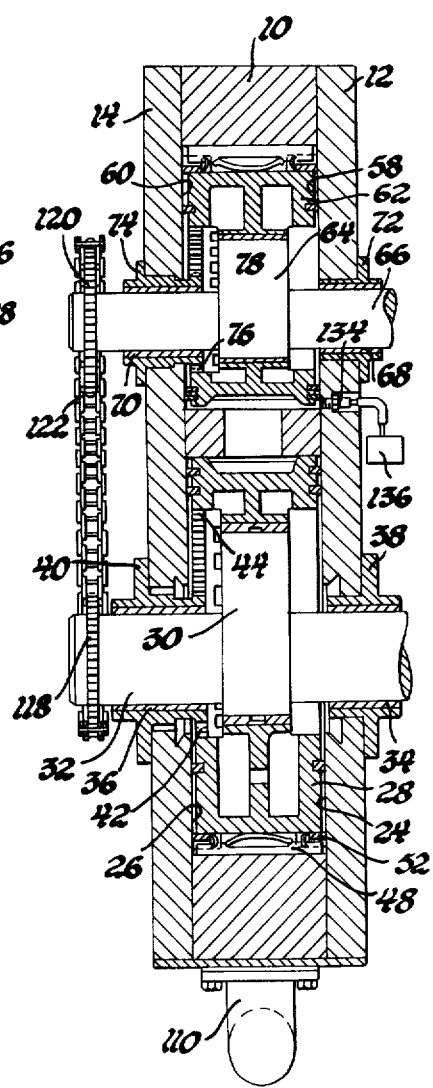
Fig. 1
Fig. 2

CARBURETED PRECHAMBER ROTARY COMBUSTION ENGINE

This invention relates to a carbureted prechamber rotary combustion engine and more particularly to a rotary engine arrangement having a spark ignited rich air-fuel rotary engine section and a hot combustion gas ignited lean air-fuel rotary engine section.

In rotary combustion engines as in reciprocating piston combustion engines, the fuel charge may be stratified in an effort to meet emission standards with maximum fuel economy. Of the various stratified charge arrangements that have been proposed for use in rotary engines of the presently commercial type, it is believed that a carbureted prechamber type of stratified charge arrangement presents a substantial amount of promise in meeting the designated task.

According to the present invention there is provided a carbureted prechamber rotary combustion engine for reducing undesirable emissions while maximizing fuel economy comprising a main chamber section and a prechamber section, each having a rotor with a plurality of chambers thereabout that expand and contract while moving with the rotor as the rotor rotates. A lean air-fuel mixture is fed to the main chambers while a rich air-fuel mixture is supplied to the chambers in the prechamber section. The rich air-fuel mixture is spark ignited in the prechamber section and the resulting hot combustion gases are directed by a gas transfer port into the chambers in the main chamber section where they efficiently ignite the lean air-fuel mixture. This engine arrangement thus provides many advantages. For example, the chambers in the prechamber section are scavenged, the prechamber section has no valves, the prechamber section also produces power to increase the overall efficiency of the engine, and the exhaust from the prechamber section is proportional to speed and load and therefor can be used for exhaust gas recirculation without complicated controls. Furthermore, the hydrocarbon and carbon monoxide emissions are low due to an overall lean mixture ratio and the nitric oxides are low due to the rich combustion in the prechamber section and subsequently lean combustion in the main chamber section.

An object of the present invention is to provide a new and improved carbureted prechamber rotary combustion engine.

Another object is to provide in a carbureted prechamber rotary combustion engine a prechamber rotary engine section in which a rich air-fuel mixture is spark ignited and the hot combustion gases that result are directed into a lean air-fuel mixture in a main chamber rotary engine section for efficient combustion of the lean air-fuel mixture.

Another object is to provide a carbureted prechamber rotary combustion engine having phased prechambers and main chambers in different rotary engine sections that simultaneously expand and contract wherein a rich air-fuel mixture is spark ignited in the prechambers and delivered by a single gas transfer port to a lean air-fuel mixture in the main chambers to effect efficient combustion thereof.

These and other objects of the present invention will be more apparent from the following description and drawing in which:

FIG. 1 is a front elevational view with parts in section of a carbureted prechamber rotary combustion engine according to the present invention.

FIG. 2 is a view taken along the line 2—2 in FIG. 1.

Figure 3:
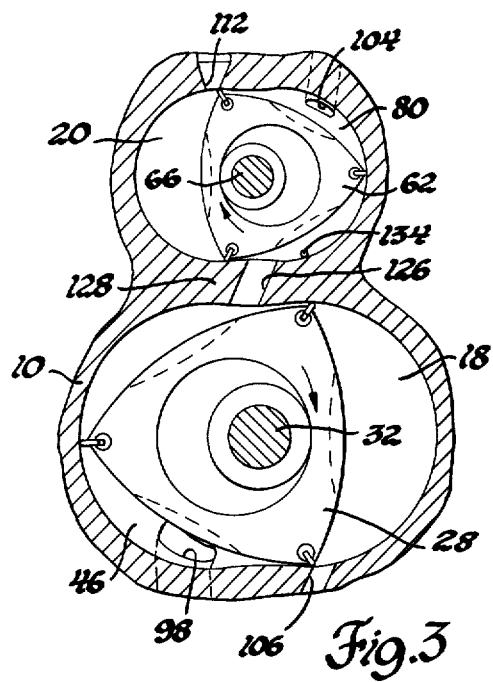
FIGS. 3 – 6 illustrate different operating phases of the engine.

As shown in FIGS. 1 and 2, the rotary engine according to the present invention comprises a stationary body having a rotor housing 10 clamped between a pair of end housings 12 and 14 by a plurality of bolts 16 that are circumferentially spaced about the housings. The housings cooperatively provide the main stationary structure of a main chamber rotary engine section 18 and also a prechamber rotary engine section 20. In the main chamber rotary engine section, the rotor housing 10 has an inwardly facing peripheral wall 22 and the end housings 12 and 14 have oppositely facing internal end walls 24 and 26 which cooperatively provide a cavity in which a main chamber rotor 28 is located. The rotor 28 is rotatably mounted on an eccentric 30 of a crankshaft 32 which is mounted on opposite sides of the eccentrics in sleeve bearings 34 and 36. The sleeve bearings 34 and 36 are held in collars 38 and 40 that are bolted to the respective end housings 12 and 14. The collar 40 on its inboard end has a phasing gear 42 formed thereon which meshes with an internal tooth rotary phasing gear 44 formed on one side of the rotor 28 concentric with the rotor's hub. The rotary phasing gear 44 has one and one-half times the number of teeth as the stationary phasing gear 42 and the inner peripheral wall 22 is a two-lobe epitrochoid or a curve parallel thereto and the rotor 28 has three lobes which face this peripheral wall to provide three main chambers 46 which are spaced about and move with the rotor while expanding and contracting in a fixed phase relationship to the engine housing twice during each rotor revolution while the rotor revolves once for every three revolutions of the main crankshaft 32.

The chambers 46 are sealed by apex seals 48, side seals 50 and corner seals 52. Each of the apex seals 48 is mounted on the rotor at each rotor apex and extends the width thereof and is biased to sealingly contact the peripheral wall 22 while the side seals 50 are mounted on the sides of the rotor and extend between the rotor apexes and are biased to sealingly contact the oppositely facing end wall. The corner seals 52 are each mounted in a rotor side near an apex and are biased to engage the oppositely facing end wall and provide a sealing link between adjacent ends of the side seals and one end of the adjacent apex seal. In addition, there is provided an oil seal 54 mounted in each rotor side that is biased to sealingly engage the oppositely facing end wall to prevent oil used for lubrication from reaching radially outward to the working chambers.

Similarly, in the prechamber rotary engine section 20, the rotor housing 10 has an inner peripheral wall 56 and the end housings 12 and 14 have oppositely facing inner end walls 58 and 60 which cooperate to define a cavity in which a prechamber rotor 62 is located. The rotor 62 is rotatably mounted on an eccentric 64 of a crankshaft 66 which in turn is rotatably mounted on opposite sides of the eccentric in sleeve bearings 68 and 70 that are held in collars 72 and 74 which are bolted to the respective end housings 12 and 14. A stationary phasing gear 76 formed on the inboard end of collar 74 meshes with an internal tooth rotary phasing gear 78 formed on one side of rotor 62. The gear ratio of the prechamber phasing gears 76 and 78 is the same as that of the main chamber phasing gears 42 and 44 while the prechamber peripheral wall 56 and flanks of prechamber rotor 62 have similar shapes but smaller dimensions than the corresponding main chamber peripheral wall 22 and flanks of main chamber rotor 28 to provide three prechambers 80 smaller than the main chambers 46 which are spaced about and move with the rotor 62 while expanding and contracting as this rotor is forced to rotate at one-third the speed of the crankshaft 62 in fixed phase relation to the stationary engine body. Also like on the main chamber rotor 28, there are provided apex seals 82, side seals 84, corner seals 86, and oil seals 88 on the prechamber rotor 62 to provide sealing for the prechambers 80.

Describing now the fuel induction and atmospheric exhaust arrangement of the engine, there are provided two separate carburetors 90 and 92 which are simultaneously controlled through linkage, not shown, by the operator and deliver relatively lean and rich air-fuel mixtures to the main chamber and prechamber rotary engine sections 18 and 20, respectively. In the main chamber rotary engine section 18, the lean mixture carburetor 90 is mounted on an intake manifold 94 which is bolted to the engine housing. The intake manifold 94 communicates with a pair of intake passages 96 in the end housings 12 and 14 that terminate with oppositely facing side intake ports 98 in the end walls 24 and 26, only one intake passage and intake port being shown. The intake ports 98 are located so as to be opened past the rotor sides to the large main chambers 46 as they are expanding in an intake phase and then be closed to these chambers by the rotor sides as they are contracting during a compression phase as rotor 28 rotates in the direction indicated by the arrow in FIG. 1. Similarly, in the prechamber rotary engine section 20, the rich mixture carburetor 92 is mounted on an intake manifold 100 which is bolted to the engine housing and communicates with a pair of intake passages 102 in the end housings 12 and 14 that terminate with oppositely facing side intake ports 104 in the end walls 58 and 60, only one such intake passage and intake port being shown. The intake ports 104 are located so that they are open past the rotor sides to the small prechambers 80 as they are expanding in an intake phase and are then closed to these chambers by the rotor sides as they are contracting in a compression phase as rotor 62 rotates in the direction indicated by the arrow in FIG. 1 which is the same as the turning direction of the main chamber rotor 28.

Each rotary engine section also has a separate atmospheric exhaust arrangement, the main chamber rotary engine section 18 having an exhaust port 106 in the peripheral wall 22 which is opened by passage of the apex seals 48 to connect the trailing main chambers during an exhaust phase to an exhaust passage 108 in the rotor housing which communicates with an exhaust pipe 110 that is bolted to the engine housing. Similarly, in the prechamber rotary engine section 20, there is provided an exhaust port 112 in the peripheral wall 56 that is opened by the passing apex seals 82 to connect the trailing prechambers 80 to an exhaust passage 114 in the rotor housing which communicates with an exhaust pipe 116 that is bolted to the rotor housing.

The main chamber and prechamber sections 18 and 20 have thus far been described as to their separate details. Describing now their cooperative association, there is provided a fixed phase relationship between the two rotary engine sections by sprockets 118 and 120 which are secured to one end of the respective crankshafts 32 and 66 and engage a chain 122. The sprockets 118 and 120 have the same pitch diameter and the crankshafts are indexed relative to each other to phase the two rotors 28 and 62 so that the main chambers 46 and prechambers 80 are phased in pairs that simultaneously expand and contract in the intake, compression, expansion and exhaust phases of their cycle at the same time as the two rotors rotate in opposite directions. In addition, there is provided a gas transfer port 126 through the partition 128 in the rotor housing 10 that separates the two peripheral walls 22 and 56. The gas transfer port 126 has an opening 130 on the leading side of the cusp 131 in the prechamber peripheral wall 56 and another opening 132 on the leading side of the cusp 133 in the main chamber peripheral wall 22 which are located opposite the respective intake and exhaust porting in these engine sections and relative to each other so that each prechamber 80 is connected by gas transfer port 126 to the main chamber 56 with which it is in phase commencing near the end of their compression phases and extending into and concluding during their expansion or power phases of the engine cycle as will be described in more detail later. In addition, there is provided a spark plug 134 which is mounted in the prechamber rotary engine section 20 in the end housing 12 with its electrodes located in a hole in the end wall 58 so as to be exposed to the prechambers 80 just upstream of the opening 130 to the gas transfer port 126. The spark plug 134 is fired at the proper time by an ignition circuit 136 of any suitable conventional type as will be described in more detail later.

Figure 4:
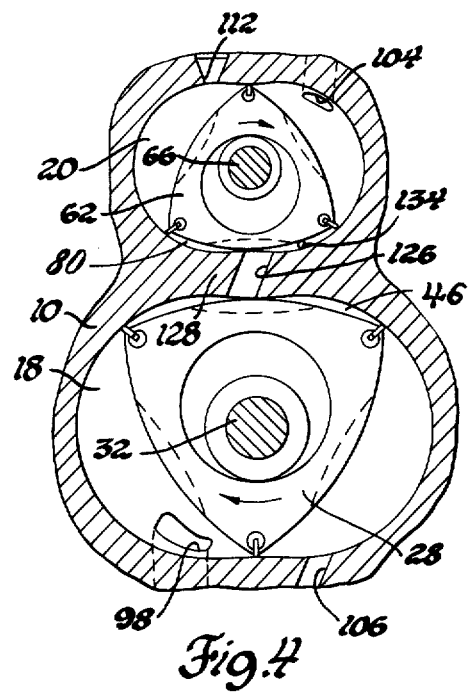
Figure 5:
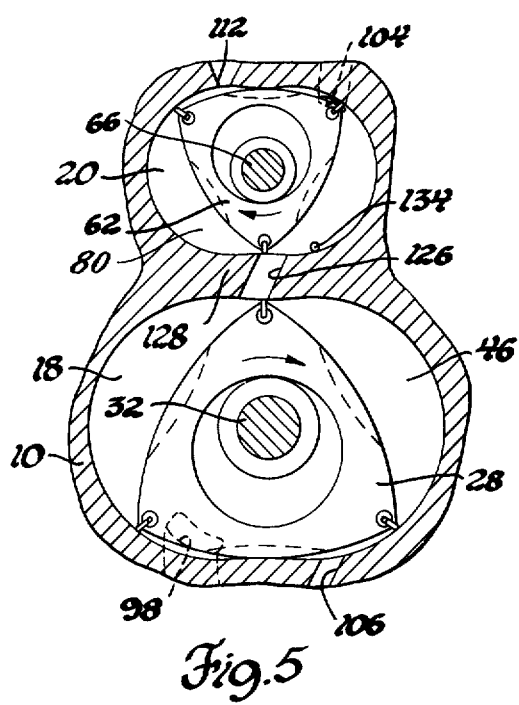
Figure 6:
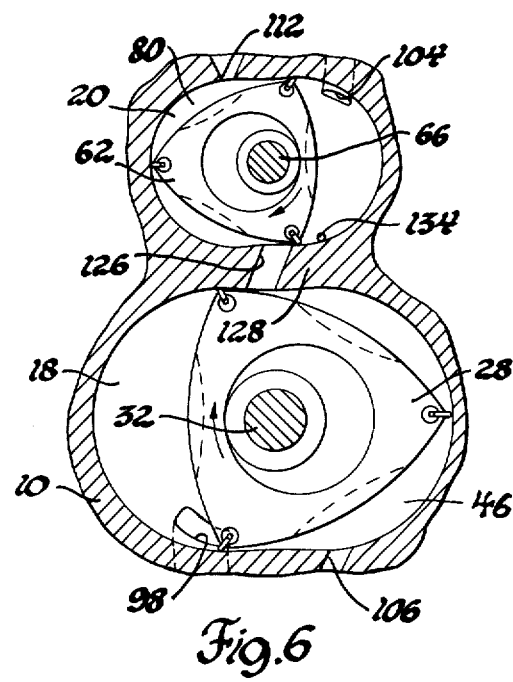

Describing now a typical operation of the carbureted prechamber rotary combustion engine structure described above, reference will be made to FIGS. 3, 4, 5 and 6, wherein the engine is shown schematically during different phases of its operation. First considering the induction or intake process with reference to FIG. 3, a carbureted lean air-fuel mixture from the carburetor 90 is inducted into the singularly designated large main chamber 46 through the intake port 98 while a rich fuel mixture from the carburetor 92 is inducted into the singularly designated small prechamber 80 through the intake port 104. The rotors 28 and 62 rotate in the same direction and the charges in the main chamber 46 and prechamber 80 which are in phase with each other are then compressed to the point of ignition shown in FIG. 4. During the compression a minimal amount of lean air-fuel mixture is forced through the transfer port 126 into the rich air-fuel mixture in the leading portion of prechamber 80 because of the similar compression ratios of the main chamber section and the prechamber section and when both chambers are near their minimum volumes, the spark plug 134 is fired so that ignition originates in the prechamber 80. Because the prechamber mixture is rich, the combustion is regular and the flame speed is fast causing a higher pressure in the prechamber 80 than in the main chamber 46. This pressure differential forces the flow of hot burned gases through the transfer port 126 into the large main chamber 46 where most of the lean air-fuel mixture has passed by the opening 132 after the combustion in the small prechamber 80. These hot combustion gases then serve as a high intensity ignition source that causes the lean air-fuel mixture in the main chamber 46 to undergo reliable, complete combustion. FIG. 5 shows the expansion or power phase wherein both the main chamber 46 with the lean fuel mixture and the prechamber 80 with the rich mixture undergo expansion with the combustion occurring therein and produce power to drive their respective crankshafts 32 and 66. Engine power can thus be taken from either or both the crankshafts. Following the expansion phase, the chambers 46 and 80 are exhausted as shown in FIG. 6 with the prechamber being scavenged in the same manner as the main chamber.

Other emission control operations are also possible with such an engine arrangement. For example, if the size of the prechambers 80 is very small in comparison with the main chambers 46, for example 5–20% of the main chamber volume, some of the exhaust gas from the prechamber exhaust manifold can be exhausted into the main chamber intake manifold for exhaust gas recirculation. Since the exhaust gas being circulated would then already be proportional to engine speed and load, the need for a complicated control system for gas exhaust circulation according to these parameters could be avoided.

Thus, it is seen that there is provided a fully carbureted prechamber rotary combustion engine wherein in the prechamber rotary engine section of the engine, the precombustion chambers have no valves and are scavenged and the prechamber rotor produces power and is therefor more efficient. Furthermore, the exhaust from the rich burning precombustion chambers can be used for exhaust gas recirculation without the need for a control system that would control the gas recirculation in proportion to engine speed and load since the gas flow being recirculated is already proportional thereto. Furthermore, the hydrocarbon and carbon monoxide emissions are low because of the lean overall mixture ratio while the nitric oxides are low because of the spark initiated combustion of the rich mixture in the small prechambers and the subsequent hot gas initiated combustion in the large main chambers of most of the separately inducted lean air-fuel mixture.

The above described embodiment is illustrative of the invention which may be modified within the scope of the appended claims.

I claim:

1. A rotary combustion engine comprising a main chamber section and a prechamber section, each said section having a rotatably supported rotor with a plurality of chambers thereabout that expand and contract while moving with said rotor as said rotor rotates, each said section also having an intake port that opens to the chambers in this section as they expand during an intake phase, each said section also having an exhaust port that opens to the chambers in this section as they contract during an exhaust phase, the chambers in said prechamber section being substantially smaller than the chambers in said main chamber section, means drivingly connecting said rotors so that the chambers in said sections are phased in pairs that simultaneously expand and contract, a gas transfer port that connects the phased pairs of the chambers in said sections only as they contract and then expand in a compression phase and a power phase respectively, lean air-fuel supply means for supplying a lean air-fuel mixture to the intake port of said main chamber section, rich air-fuel supply means for supplying a rich air-fuel mixture to the intake port of said prechamber section, and spark ignition means in said prechamber section for first igniting the rich air-fuel mixture in the chambers in said prechamber section whereby ignition originates in the chambers in said prechamber section and there is effected a pressure differential causing hot combustion gases in the chambers in said prechamber section to flow through said gas transfer port and ignite the lean air-fuel mixture in the associated chambers in said main chamber section.

2. A rotary combustion engine comprising a main chamber section and a prechamber section, each said section having a multi-lobe internal peripheral wall and a rotatably supported multi-lobe rotor with a plurality of chambers thereabout that expand and contract while moving with said rotor as said rotor rotates, each said section also having an intake port that opens to the chambers in this section as they expand during an intake phase, each said section also having an exhaust port that opens to the chambers in this section as they contract during an exhaust phase, the chambers in said prechamber section being substantially smaller in volume than the chambers in said main chamber section, means drivingly connecting said rotors so that the chambers in said sections are phased in pairs that simultaneously expand and contract, a gas transfer port that connects the phased pairs of the chambers in said sections only as they contract and then expand in a compression phase and a power phase respectively, lean air-fuel supply means for supplying a lean air-fuel mixture to the intake port of said main chamber section, rich air-fuel supply means for supplying a rich air-fuel mixture to the intake port of said prechamber section, and spark ignition means in said prechamber section for first igniting the rich air-fuel mixture in the chambers in said prechamber section whereby ignition originates in the chambers in said prechamber section and there is effected a pressure differential causing hot combustion gases in the chambers in said prechamber section to flow through said combustion gas transfer port and ignite the lean air-fuel mixture in the associated chambers in said main chamber section.

3. A rotary combustion engine comprising a main chamber section and a prechamber section, each said section having a two-lobe internal peripheral wall, each said section also having a rotatably supported crankshaft with an eccentric, each said section also having a rotor rotatably mounted on said eccentric and cooperating with the associated peripheral wall to provide three chambers about the rotor that expand and contract while moving with said rotor as said rotor rotates, each said section also having a stationary phasing gear meshing with a rotary phasing gear on the rotor in this section so that the rotor rotates at one-third the speed of the crankshaft in this section and in fixed relationship to the peripheral wall in this section, each said section also having an intake port that opens to the chambers in this section as they expand during an intake phase, each said section also having an exhaust port that opens to the chambers in this section as they contract during an exhaust phase, the chambers in said prechamber section being substantially smaller in volume than the chambers in said main chamber section, means drivingly connecting with crankshafts with a one-to-one speed ratio so that the chambers in said sections are phased in pairs that simultaneously expand and contract, a gas transfer port that connects the phased pairs of the chambers in said sections only as they contract and then expand in a compression phase and a power phase respectively, lean air-fuel supply means for supplying a lean air-fuel mixture to the intake port of said main chamber section, rich air-fuel supply means for supplying a rich air-fuel mixture to the intake port of said prechamber section, and spark ignition means in said prechamber section for first igniting the rich air-fuel mixture in the chambers in said prechamber section whereby ignition originates in the chambers in said prechamber section and there is effected a pressure differential causing hot combustion gases in the chambers in said prechamber section to flow through said gas transfer port and ignite the lean air-fuel mixture in the associated chambers in said main chamber section.

* * * * *